(12) United States Patent
Watson

(10) Patent No.: US 7,366,348 B2
(45) Date of Patent: Apr. 29, 2008

(54) SEGMENTATION OF IMAGES USING THE WATERSHED METHOD

(75) Inventor: Alistair Imeson Watson, Dunblane (GB)

(73) Assignee: Heligon Limited, London (GB)

( * ) Notice: Subject to any disclaimer, the term of this patent is extended or adjusted under 35 U.S.C. 154(b) by 485 days.

(21) Appl. No.: 10/499,332

(22) PCT Filed: Dec. 18, 2002

(86) PCT No.: PCT/GB02/05754

§ 371 (c)(1),
(2), (4) Date: Jun. 17, 2004

(87) PCT Pub. No.: WO03/052696

PCT Pub. Date: Jun. 26, 2003

(65) Prior Publication Data

US 2005/0013483 A1    Jan. 20, 2005

(30) Foreign Application Priority Data

Dec. 18, 2001 (GB) ................................. 0130210.8

(51) Int. Cl.
*G06K 9/00* (2006.01)
*G06K 9/66* (2006.01)

(52) U.S. Cl. ..................................................... 382/164
(58) Field of Classification Search ................ 382/162, 382/164, 165, 167, 172, 173, 181, 195, 305; 358/515, 518, 522, 538
See application file for complete search history.

(56) References Cited

U.S. PATENT DOCUMENTS

| 5,933,524 A | 8/1999 | Schuster et al. |
| 6,668,080 B1 * | 12/2003 | Torr et al. ................... 382/173 |
| 6,888,965 B1 * | 5/2005 | Rath et al. .................. 382/173 |
| 7,020,329 B2 * | 3/2006 | Prempraneerach et al. . 382/164 |
| 2003/0113017 A1 * | 6/2003 | Thomas et al. ............. 382/181 |
| 2004/0208372 A1 * | 10/2004 | Boncyk et al. ............. 382/181 |
| 2005/0013483 A1 * | 1/2005 | Watson ....................... 382/164 |

OTHER PUBLICATIONS

L. Vincent et al: "Watersheds In Digital Spaces: An Efficient Algorithm Based On Immersion Simulations"; IEEE Transactions On Pattern Analysis And Machine Intelligence, IEEE, Inc., New York; vol. 13, No. 6, Jun. 1991, pp. 585-598.
Sang Ho Park et al: "Color Image Segmentation Based On 3-D Clustering-Morphological Approach"; vol. 31, No. 8., Pattern Recognition Society; Pergamon Press, Inc., Elmsford, New York; XP 004131007, pp. 1061-1076; Aug. 1, 1998.
Laurent Najman et al: "Geodesic Saliency Of Watershed Contours And Hierarchical Segmentation"; IEEE Transactions On Pattern Analysis And Machine Intelligence; IEEE, New York; vol. 18, No. 12, pp. 1163-1173, XP000640564; Dec. 1, 1996.
P. Soille: Morphological Image Analysis Principles and Applications, Chapter 10, Second Edition, Publisher—Springer, 1999.
P. Soille: Morphological Image Analysis Principles And Applications, Chapter 9, pp. 267-292, Second Edition, Publisher—Springer, 1998.

* cited by examiner

*Primary Examiner*—Amir Alavi
(74) *Attorney, Agent, or Firm*—Breiner & Breiner, LLC

(57) ABSTRACT

A method of determining a unique number of colors for an image is described which uses homotopic transformation (in particular the watershed transformation) within feature space formed by red, green and blue components, or any other set of attributes, of the pixels of the image. Each color is given a label and the image is then segmented into regions of uniform labels. The color or characteristic of each segment can then be altered or used to identify an object. The method can be applied to any scalable, either integer or real, data set.

16 Claims, 4 Drawing Sheets

FIGURE 3

ASSIGNING A SECOND LABEL TO A SET OF PARAMETER VALUES IF THE NODE REPRESENTING THAT SET IS ADJACENT NODES REPRESENTING SETS THAT HAVE BEEN ASSIGNED DIFFERENT LABELS

FIGURE 4

DETERMINING SETS OF PARAMETER VALUES WHICH WERE FIRST TO BE ASSIGNED EACH LABEL

DETERMINING WHICH OF THE NODES DETERMINED IN THE PRIOR STEP IS CLOSEST TO THE NODE REPRESENTING THE SET OF PARAMETER VALUES TO WHICH THE SECOND LABEL IS TO BE ASSIGNED

DETERMINING THE SECOND LABEL TO BE THE LABEL ASSIGNED TO THE SET REPRESENTED BY THE CLOSEST NODE AS DETERMINED IN THE PRIOR STEP

REASSIGNING LABELS TO SET OF PARAMETERS THAT HAVE BEEN ASSIGNED A THIRD LABEL WHEN THE NUMBER OF SETS OF PARAMETERS ASSIGNED THE THIRD LABEL IS BELOW A THRESHOLD

SEGMENTATION OF IMAGES USING THE WATERSHED METHOD

BACKGROUND OF THE INVENTION

In recent years, vast strides have been made in the field of computer-assisted image processing. The creation and manipulation of images has proved a boon to many engaged in the graphic arts field, industrial monitoring, and surveillance, but there are still problems in the initial stages of rendering an already existing image into processable form. The classic approach to securing a computerised image is to scan a photographic original to form a file in which data are stored representing properties of a large number of portions of the image, so-called pixels. Each pixel is characterised by a number of parameters corresponding to colour and intensity, and the file contains data relating to the location of each pixel so that when the file is called up by an appropriate program, the image is displayed on screen. Most recently, the process of scanning has been supplemented by the development of so-called digital camers, which produce an image file directly.

In order to process the image to the form desired by the user, it often needs to be broken down into different parts, for example those corresponding to background and displayed object, in order to change the colour balance of the background without affecting that of other parts of the image. This process of segmentation is time-consuming and requires a high degree of skill. Attempts to automate the process have been made, but they do not work well or easily, as the intellectually comprehensible pieces of an image, clear to any human viewer, are simply not easily identifiable by a computer.

SUMMARY OF THE INVENTION

The present invention seeks to provide a method of analysing the data in an image file to yield information quite independent of human intervention. It seeks to enable patterns or structures within a data set, if such exist, to be revealed and used, both to describe the data and to make predictions if such patterns recur. The method does not depend upon superimposed assumptions based upon current theory and knowledge. It is implemented by the use of a computer system, and thus can enable that computer system to receive or gather data about the external world, either by importation of a picture of that world, or by direct input from a suitable camera" system, and then to analyse such data without preconceptions. The system can thus arrive at an understanding of the world, and, if desired enable accurate predictions to be made about the world. Such a system can thus be seen as forming a basis for machine intelligence.

Several examples in which a digitised image is segmented on the basis of colour by a method according to the invention are set out in examples 1, 2 and 3.

The invention essentially uses homotopic transformations, specifically the watershed transformation, within feature space formed by the colour components of the pixels of an image. These may be represented in many colour spaces, such as HLS (Hue, Lightness, Saturation), RGB (Red, Green, Blue), or CYMK (Cyan, Yellow, Magenta, Key). Images may be processed in their original colour space, or transformed into a different one before processing. Furthermore, additional channels of information may be generated algorithmically from the data, for example by performing an analysis relating to texture for each pixel, and included in the classification process. Additionally, rather than performing only one classification, in all the dimensions at once, there exists the option of performing several classifications, each in a subspace of the feature space, and of then making reference to some or all of the classifications in the segmentation process. This enables a unique number of colours, groups of colours, or contiguous regions in feature space, hereinafter called classes", to be found for that image. Each class is given a label and the image is then segmented into regions of uniform labels. The colour of each segment can then, for example, be altered or used to identify an object.

The method can be applied to any scalable (either integer or real) data set. While the usual number of dimensions for the histogram is three, it is of course possible to use more, or fewer, if desired, but use of more than three dimensions materially increases the amount of computing power and computer memory required to carry out the necessary analysis. It should be noted that in using the method, the lattice resolution and connectivity will both affect the number of sets (as defined below) found.

BRIEF DESCRIPTION OF THE DRAWINGS

FIG. 3 illustrates a further sub-step to the method of FIG. 2.

FIG. 4 illustrates a method of determining the second label of FIG. 2.

DESCRIPTION OF PREFERRED EMBODIMENTS

Figure 1:
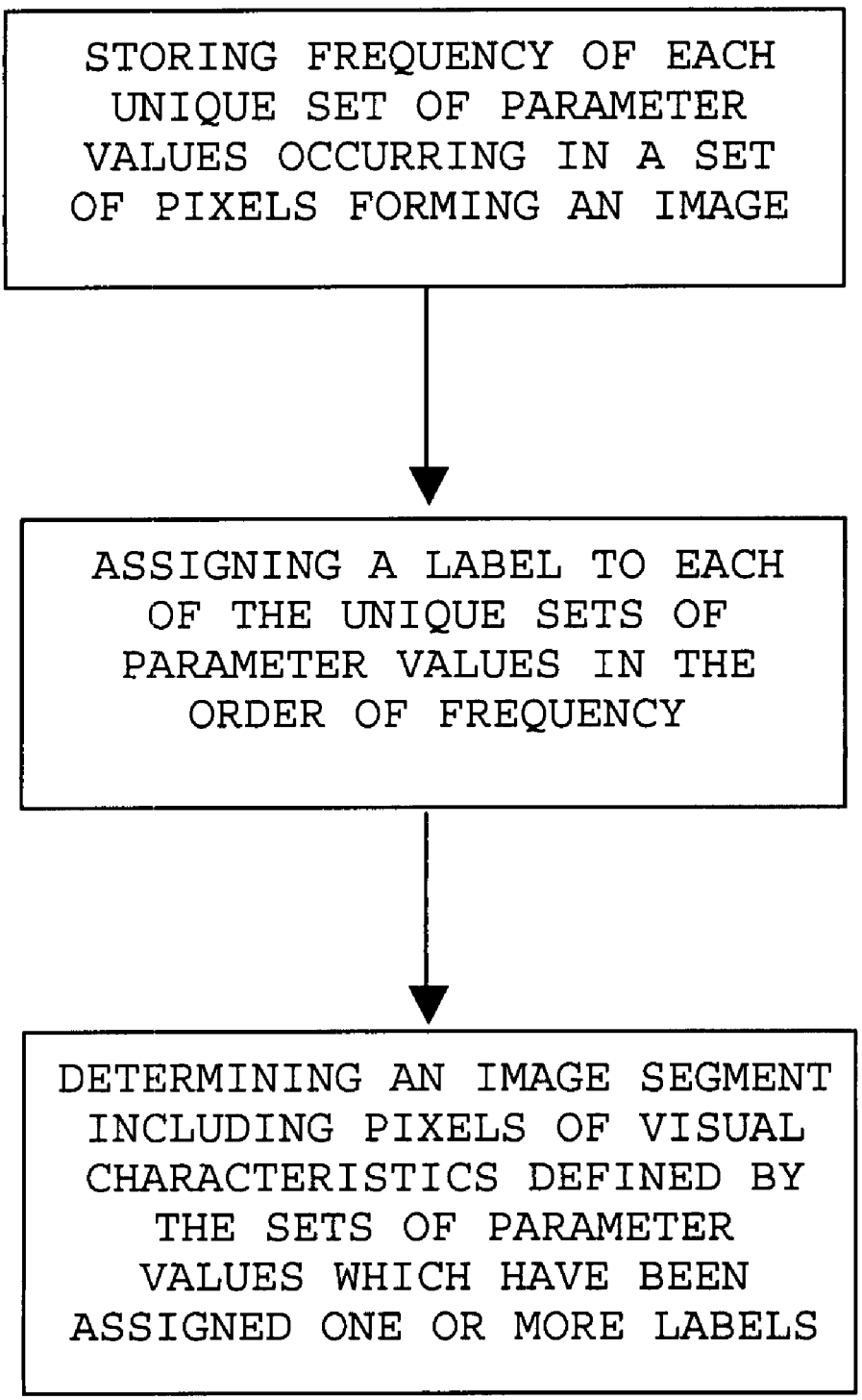
FIG. 1 illustrates steps of a method of segmenting a digital image formed from an array of pixels according to the invention.
Figure 2:
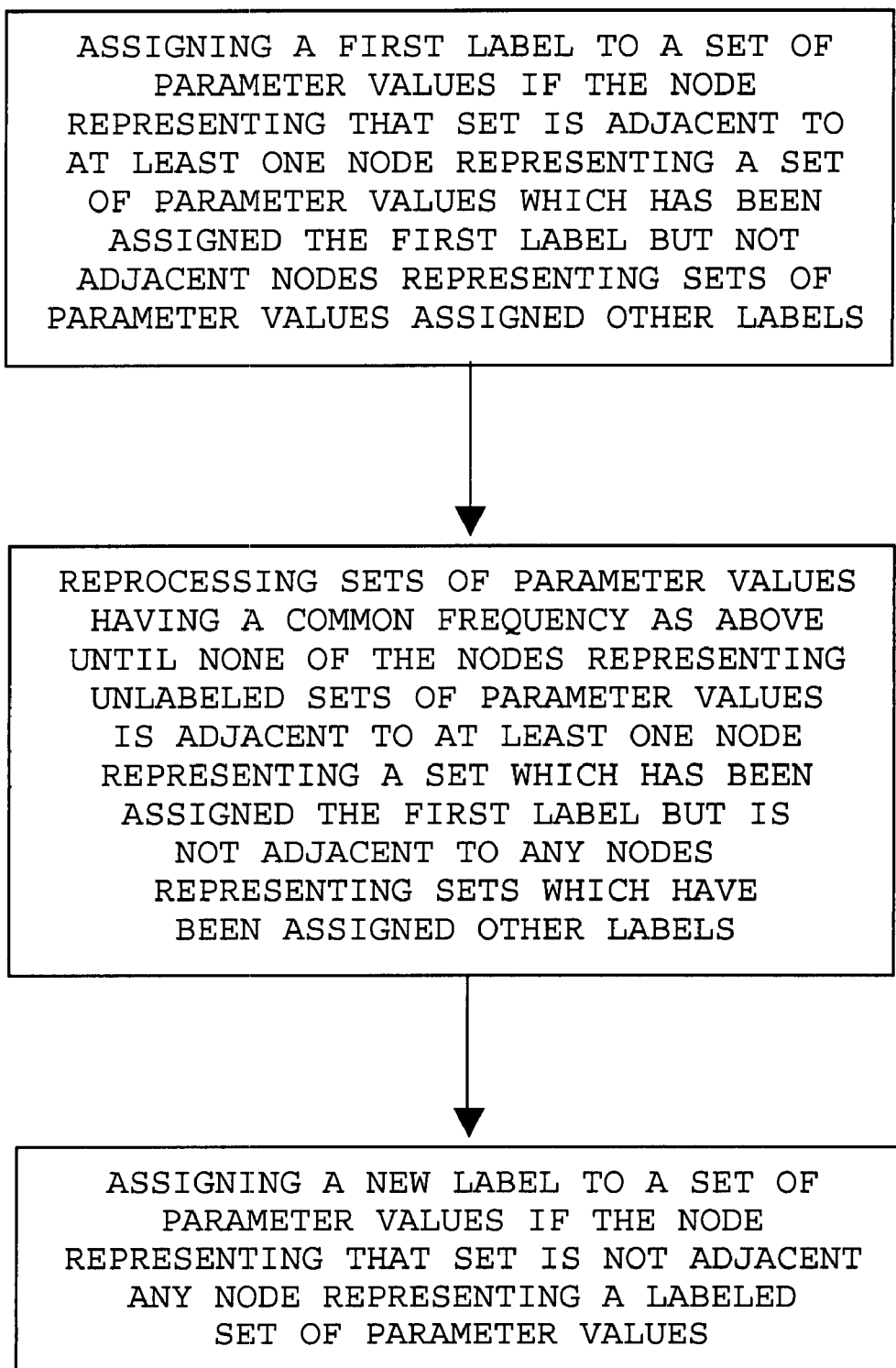
FIG. 2 illustrates the sub-steps of the assigning of the labels of the sets of parameter values of FIG. 1.
Figure 5:
FIG. 5 illustrates an additional step to the method of FIG. 1.

In order to understand the theory behind the method, it is necessary to bear in mind the following definitions:

Lattice—A set of nodes and connections between the nodes. An Euclidean lattice is a square grid pattern, with the nodes being the intersections, and the lines between them representing the connections. For a simple 2-dimensional Euclidean lattice, there are two possible ways of defining the connectivity. a) The 4-connected lattice consists of allowing nodes to be adjacent only if they differ by only one on one dimension. This means that each node on the lattice has 4 neighbours, hence the name. b) The 8-connected lattice consists of allowing nodes to be adjacent if they differ by only one on any number of dimensions, including the case where the node differs by one on both dimensions. Thus the connectivity includes the diagonal nodes and there are in this case 8 nearest neighbours, and hence the name. The nature of any lattice and its connectivity can be defined for any number of dimensions by extension of the 2-dimensional case.

Geodesic distance—Any distance on a lattice must be measured along a continuous string of adjacent nodes. The string of adjacent nodes is known as a path. The geodesic distance between any 2 nodes is the path, out of all possible paths between the nodes, which has the minimum distance.

Set—A collection of nodes, each of which is adjacent to at least one other node in the group. Thus, you can, by moving only between adjacent nodes on the lattice, get from any member of the set to any other.

Jordan's Lemma—A process (such as adding/subtracting a node to a set) preserves homotopy if nodes that were previously connected by a path remain connected, and those that were not connected by a path remain disconnected. Thus, if there exist n sets before the operation, there must only be n sets after the operation. Processes which satisfy the homotopy condition, if used exclusively, will guarantee that if there are n sets in a data set represented on a given lattice, then only n sets will be 'discovered' or revealed at the end of applying the processes.

Monotonic—A series of numbers in which each number is either as great (small) or greater (smaller) than its predecessor.

Fall-set—This is a path in which the numerical value, of the nodes varies monotonically, starting from a high value. If the path were followed from its high end to its low end, then by analogy with water flowing down a hillside this would describe how the water flowed. The nodes to which no water flows, and from which water flows, define a 'watershed'. Hence, the algorithms that discover these nodes are known as 'watershed' algorithms.

The method of the invention is based on the idea of a fall-set, geodesic distance, and Jordon's Lemma. Jordon's Lemma gives the legitimate transformations of sets such that homotopy (number of sets) is preserved. Definition of a set: All those points that are connected continuously. Continuity is defined as being equivalent to adjacency on the lattice. Therefore, a set is all those points that are connected by a string of points that are members of the set. The Lemma states that a point can be added (or subtracted) provided that no point previously unconnected becomes connected (or any point previously connected becomes disconnected). A transformation that satisfies this restriction will conserve homotopy or keep the number of sets constant. By selecting as a seed point the highest point of the histogram which must belong to a set and then adding to it adjacent points that are lower and uniquely connected to that initial point (thus satisfying Jordan's Lemma), the fall set for that seed point will be discovered and defined. The identification by the algorithm of other seed points that are independent and uniquely definable ensures that if there are n sets (groups, classes) in the feature space only n will be found. By using the geodesic measure from the seed point for every point in the set, those points on the lattice that may be connected to several sets, and are therefore boundary points, can be assigned to the group they are nearest to in terms of geodesic distance from the seed point of that group.

The process is thus capable of discovering the number of homogeneous colours there are in any image. Once the number and precise definition of the groups is known then the original image can be segmented into homogeneous regions.

The method of the invention provides segmentation in a fashion which is qualitatively distinguished from previous approaches, which have used statistical decision theory. Instatistical decision theory, the number and mathematical description of the sets within the data, or the distributions within a feature space are assumed to be known. Further, it is assumed that the shape of each set is expressible as a continuous mathematical function. All these assumptions are totally erroneous. There is no rational procedure to calculate the number of colours in an image. The shape of the sets within the feature space (histogram) is never regular either in outline or in profile. The data are discrete and in no respect can such data be treated as continuous. At best, the traditional statistical decision theory approach is a very poor approximation to the actual distributions within feature space, and this inevitably leads to errors in assigning pixels to a set. In contrast, the method according to the invention describes the data accurately and therefore cannot be bettered, merely equalled in accuracy. It is the only method that can find an answer to the problem of 'how many sets or colours are there in any one image?'. The answer for any given resolution (radiometric) and lattice connectivity is unique.

Instances of a data set, measured on at least interval scales, can be represented within a feature space, the axes of which are the dimensions of the data. Once the data is so represented, then the watershed algorithm can be used to describe precisely the number, size and shape of the independent sets (classes, groups) of the data. This is the basis of knowledge. Once the division of the feature space into its constituent sets (classes) has been completed, then it only remains to assign significance to each set and then to make predictions on the basis of a point belonging to a particular set. The watershed algorithm is thus a rigorous method of describing data for the purpose of prediction. It can also be used to segment (determine to which colour group a particular pixel belongs) any data set. It is unique in being able to describe any data set precisely in terms of the number, shape, and size of its components. No other method can ever do better than, only at best duplicate, the watershed solution.

The watershed algorithm used in the present invention can be applied to any data set that has the following characteristics:
1. The number of instances is large.
2. The component measures for each instance within the data set are all at least interval.

These are not severe restrictions and therefore the method can be applied to most data sets.

The invention is illustrated by way of the following example, which is, to conserve space and aid clarity of understanding, concerned with a data set microscopic compared with any real data set representing a pixellated image. However, it is believed that it serves to illustrate how the method is applied. The example describes the processing in simple terms, but in real implementation, all of the processes are carried out using appropriate computer programming.

EXAMPLE 1

In a first example, let us suppose we have a small image of 5 by 5 pixels, and that we have the red and green values for each pixel. This will define a 2-dimensional problem, and we would like to segment the image into its constituent 'colours', purely on the basis of the pattern of adjacent points within the feature space defined by the values of the two colours, red and green. Tables 1 and 2 show the components of an image, one for the red component, and the other for the green component.

TABLE 1

| Red Component | | | | |
|---|---|---|---|---|
| 4 | 3 | 4 | 4 | 5 |
| 5 | 4 | 1 | 2 | 1 |
| 5 | 3 | 0 | 1 | 1 |
| 1 | 1 | 0 | 1 | 2 |
| 0 | 1 | 1 | 1 | 1 |

TABLE 2

| Green Component | | | | |
|---|---|---|---|---|
| 1 | 1 | 1 | 0 | 1 |
| 2 | 1 | 5 | 4 | 3 |
| 1 | 0 | 4 | 5 | 3 |

TABLE 2-continued

| Green Component | | | | |
|---|---|---|---|---|
| 5 | 4 | 5 | 3 | 4 |
| 5 | 5 | 4 | 4 | 4 |

The first step is to construct a hash table (the most economical method of storing sparse data) containing in the following order:

The hash table position, the red component, the green component, the number of pixels having these 2 components, the label for the class (set).

The hash function in this example is $$L = \text{Mod}((R+(÷)7*G):13)$$

where R is the red value, G the green value, and L is the remainder after dividing by 13 the result of R+7*G. (1, 7, and 13 are prime numbers: the hashing technique of storing data works best with prime numbers, and the choice of the prime numbers in the hashing function depends on the range of values to be stored.) Each pixel is taken in turn and the hash table is constructed with the entry for each combination being incremented each time that combination occurs, so that the final value will give the height of the histogram for that combination. As each pixel is entered into the hash table, the red and green components are checked, and if either differs the hash table key is incremented until an empty field is found, into which the colour is added. The result is shown in Hash Table 1:

HASH TABLE 1

| 1 | | | | |
|---|---|---|---|---|
| 2 | 0 | 4 | 1 | |
| 3 | 1 | 4 | 4 | |
| 4 | 2 | 4 | 2 | |
| 5 | 3 | 0 | 1 | |
| 6 | 4 | 0 | 1 | |
| 7 | 5 | 2 | 1 | |
| 8 | 3 | 1 | 1 | |
| 9 | 0 | 5 | 2 | |
| 10 | 1 | 3 | 3 | |
| 11 | 1 | 5 | 4 | |
| 12 | 4 | 1 | 3 | |
| 13 | 5 | 1 | 2 | |

HASH TABLE 2

| 3 | 1 | 4 | 4 |
|---|---|---|---|
| 11 | 1 | 5 | 4 |
| 10 | 1 | 3 | 3 |
| 12 | 4 | 1 | 3 |
| 1 | 2 | 4 | 2 |
| 9 | 0 | 5 | 2 |
| 13 | 5 | 1 | 2 |
| 2 | 0 | 4 | 1 |
| 5 | 3 | 0 | 1 |
| 6 | 4 | 0 | 1 |
| 7 | 5 | 2 | 1 |
| 8 | 3 | 1 | 1 |
| 1 | | | |

HASH TABLE 3

| 1 | | | | |
|---|---|---|---|---|
| 2 | 0 | 4 | 1 | g |
| 3 | 1 | 4 | 4 | g |
| 4 | 2 | 4 | 2 | g |
| 5 | 3 | 0 | 1 | r |
| 6 | 4 | 0 | 1 | r |
| 7 | 5 | 2 | 1 | r |
| 8 | 3 | 1 | 1 | r |
| 9 | 0 | 5 | 2 | g |
| 10 | 1 | 3 | 3 | g |
| 11 | 1 | 5 | 4 | g |
| 12 | 4 | 1 | 3 | r |
| 13 | 5 | 1 | 2 | r |

The feature space will be considered as an Euclidean lattice that is four connected. In order to facilitate the procedure, the hash table is reordered using the fourth column (histogram height) such that the highest values occur at the beginning of the table. The result is as shown in Hash Table 2. Note that if two hash table entries differ by 1 in their red or green components (but not both) then they are considered to be adjacent. If a candidate entry is being considered as belonging to an already existing group, then provided it is adjacent to one entry of the group and not adjacent to any entry that belongs to another group, then it can be added to that group. This procedure conforms to Jordan's Lemma.

Starting at the beginning of the table, column 4, representing the histogram value for each colour, is scanned to find the maximum value. The maximum is found to be 4, and there are two such fields to consider. These differ in colour by 1 in one dimension only and are thus adjacent, and are given the same label g. Column 4 of the hash table is scanned for any field containing the histogram value 3. There are two. The first (position 10 in table 1) differs in colour from one of the 4s (position 3 in table 1) by 1 in only the green component and therefore can be assigned to the same group g. The second 3 (position 12 in table 1) differs by more than one from all the already examined entries and therefore this position is not adjacent to the g labelled positions, and is thus part of another set, and is given the label r. There being no more 3s to consider, column 4 of Hash Table 1 is next scanned for 2s. There are four, namely positions 4, 9, 10, and 13. That in position 4 differs by one in one dimension from that in position 3 and is therefore assigned label g. Position 9's entry is adjacent to position 11's, position 10's is adjacent to position 3's, and position 13's is adjacent to position 12's. None of these positions is adjacent to positions that belong to more than one group and therefore each can be added without violating Jordan's Lemma. Each is given the appropriate label. All the entries with histogram value 2 have been accounted for so the is are located in column 4. There are five, in positions 2, 5, 6, 7, and 8 of Hash Table 1. Position 2's is adjacent to two, those at positions 3 and 9 of Hash Table 1. Both these have the same label, so that in position 2 can be assigned to that label. Position 5's entry is not adjacent to that of any already labelled position so is left unlabelled. Positions 6, 7, and 8 have entries which are adjacent to an already labelled position and are therefore assigned the same label. Position 5 is again examined, and its entry is now found to be adjacent to that of two positions, 8 and 6. Both these have the same label so the position acquires that label, r. The result can be seen in Hash Table 3.

If a position is found to be adjacent to two (or more) positions which do not have the same label, it is a boundary node, and is given the label of the set to which it is closest, in the following sense. The geodesic distance to the first assigned position is computed for each of the sets and the smallest found. If the distances are equal the position is assigned to the first found group. The assignment of boundary points is not necessary to the procedure—it is a convenience that ensures a classification label is attached to every data combination. It is of course possible to leave these boundary combinations unlabelled and deal with them in some other manner.

The appropriate label can now be assigned to each pixel by computing the hash table key for that pixel and reading the label from the hash table. The result is as follows:

TABLE 6

| Final 'Segmented' Image | | | | |
|---|---|---|---|---|
| r | r | r | r | r |
| r | r | g | g | g |
| r | r | g | g | g |
| g | g | g | g | g |
| g | g | g | g | g |

TABLE 7

| Feature Space (Histogram) | | | | | | |
|---|---|---|---|---|---|---|
|   | 0 | 1 | 2 | 3 | 4 | 5 |
| 0 | 0 | 0 | 0 | 0 | 1 | 2 |
| 1 | 0 | 0 | 0 | 2 | 4 | 4 |
| 2 | 0 | 0 | 0 | 0 | 2 | 0 |
| 3 | 1 | 1 | 0 | 0 | 0 | 0 |
| 4 | 1 | 3 | 0 | 0 | 0 | 0 |
| 5 | 0 | 2 | 1 | 0 | 0 | 0 |

Table 7 is the histogram or feature space, as it would normally be represented. Using the fall set idea it is easy to see that there are just two sets in the data. When more dimensions are used the difference in time taken to scan the two tables (13 checks for the hash table, and 25 for the histogram in this case) becomes increasingly great, such that only a hash table method is feasible.

EXAMPLE 2

In a second example, the present invention provides a method using a computer for segmenting an image into a small number of homogeneous regions on the basis of the colour, the method comprising the steps of:
1. Digitising a source image to generate a digitised image file, comprising an n-dimensional map of m-tuples. Each of which represents the colour value at that point in the image.
2. Forming an m-dimensional histogram of colour frequency in the digitised image file.
3. Sorting the entries in the histogram by height.
4. Choosing a point that has the highest histogram value attained by any unlabelled point.
5. Assigning a unique label to this point as follows:
   i. If no previously labelled point is adjacent. assign a new label and geodesic distance 0.
   ii. If there are adjacent elements with the same label, assign this label and determine the geodesic distance to be the same (if histogram value is the same) or one greater than (otherwise) the least value held by the neighbour having the highest histogram value.
   iii. If there are neighbours that have different labels, ignore this point at present.
6. Finding any other points having the same height and treating them as per 5.
7. Assigning to each remaining point at this level (as ignored at 5iii) (i.e., each point which is not uniquely connected) the label of whichever of its neighbours has the lowest geodesic distance.
8. Repeating steps 4 to 7 until all points within the feature space have been assigned a label.
9. Assigning to each pixel in the image the label that is found for that combination of component values within the feature space.
10. Giving each region of uniform labels a unique label to identify that segment.

EXAMPLE 3

In a third example, the present invention provides a method for image segmentation which comprises the steps of:
1. creating or digitising an image, consisting of an N-dimensional map of data, each element of which contains the M-dimensional colour data (the value at that point in the image of each of the M colour components)
2. optionally transforming the image from its original colour space to another with the same or differing dimension (M), and/or adding further components (to increase M) generated algorithmically from the original data, e.g. 'texture', and/or scaling each component by the same or different amounts to alter the number of unique values in that band,
3. Making a histogram of frequency of each unique combination of component values ('colour'), preferably by constructing a hash table, wherein elements of the histogram are 'neighbours'/'adjacent' if their component values differ by no more than one in no more than a specified number of dimensions.
4. optionally sorting the histogram's entries into buckets, ordered by histogram value, largest first.
5. For each histogram value found, starting from the highest and working down, consider the set of colours SC with that histogram value, performing steps 6 and 7.

The invention claimed is:

1. A method for segmenting a digital image formed from an array of pixels, visual characteristics of each pixel being defined by a set of n parameters, each possible unique set of parameter values being representable as a node on an n-dimensional lattice, the method comprising steps of:

storing frequency of each said unique set of parameter values occurring in a set of pixels forming the image;

assigning a label to each said unique set of parameter values, taken in order of frequency; and determining an image segment comprising a set of pixels whose visual characteristics are defined by those sets of parameter values which have been assigned one or more specified labels;

wherein said assigning of the label to each said unique set of parameter values comprises sub-steps of:

assigning a first label to a set of parameter values if the node representing that set of parameter values is adjacent to at least one node representing a set of parameter values which has been assigned the first label, but which is not adjacent to any nodes representing sets of parameter values which have been assigned other labels;

wherein sets of parameter values having a common frequency are reprocessed according to this sub-step until none of the nodes representing unlabelled sets of parameter values is adjacent to at least one node representing a set of parameter values which has been assigned the first label but which is not adjacent to any nodes representing sets of parameter values which have been assigned other labels; and assigning a new label to a set of parameter values if the node representing that set of parameter values is not adjacent to any node representing a labelled set of parameter values.

2. A method according to claim 1, wherein said assigning of the label to each said unique set of parameter values comprises a further sub-step of assigning a second label to a set of parameter values comprises if the node representing that set of parameter values is adjacent to nodes representing sets of parameter values that have been assigned different labels.

3. A method according to claim 2, wherein the second label is one of the different labels.

4. A method according to claim 2, wherein the second label is determined according to steps of:
(a) determining those sets of parameter values which were first to be assigned each label;
(b) determining which of the nodes as determined in (a) is closest to the node representing the set of parameter values to which the second label is to be assigned; and
(c) determining the second label to be the label assigned to the set of parameter values represented by the closest node as determined in (b).

5. A method according to claim 1, wherein the set of pixels whose visual characteristics are defined by those sets of parameter values which have been assigned one or more specified labels is a connected set of pixels.

6. A method according to claim 1, wherein the frequency of each said unique set of parameter values occurring in the set of pixels forming the image is stored in a hash table.

7. A method according to claim 1, wherein the set of parameters includes parameters defining color of a pixel.

8. A method according to claim 1, wherein the image is processed to modify parameters or to generate additional parameters.

9. A method according to claim 1, wherein the set of parameters includes parameters defining texture of the image at a pixel.

10. A method according to claim 1, wherein greater than three parameters are present.

11. A method according to claim 1, wherein the set of parameters is a sub-set of a total set of parameters associated with each pixel.

12. A method according to claim 1, wherein the image segment represents an object portion or background portion of the image.

13. A method according to claim 1 further comprising changing the visual characteristics of a portion of the image defined by the image segment independently of other portions of the image.

14. A method according to claim 1, wherein each node represents two or more sets of parameter values.

15. A method according to claim 1 further comprising reassigning labels to sets of parameters that have been assigned a third label when the number of sets of parameters assigned the third label is below a threshold.

16. A system constructed and arranged to carry out the method of any one of claims 1 to 15.

* * * * *